March 12, 1963 J. A. MANINTVELD ETAL 3,081,418
SEMI-CONDUCTOR DEVICE
Filed Aug. 20, 1957 6 Sheets-Sheet 1

INVENTOR
JAN ADRIANUS MANINTVELD
LEONARD JOHAN TUMMERS
BY
AGENT

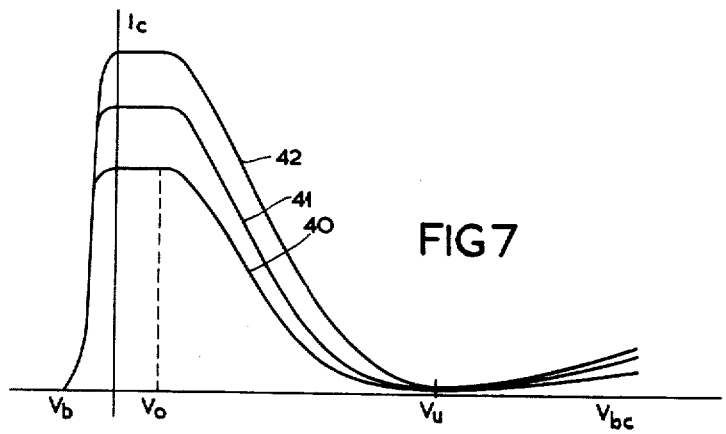
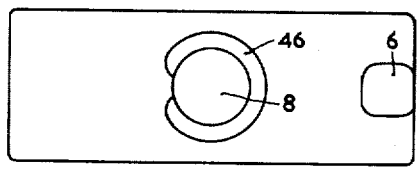
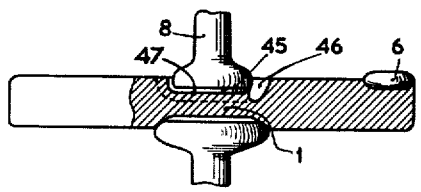
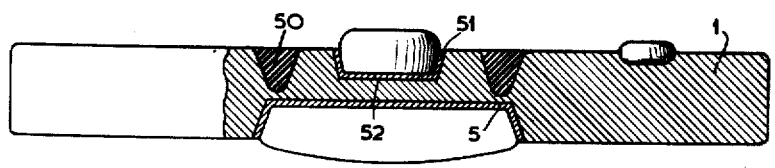

INVENTOR
JAN ADRIANUS MANINTVELD
LEONARD JOHAN TUMMERS
BY
AGENT

March 12, 1963 J. A. MANINTVELD ETAL 3,081,418
SEMI-CONDUCTOR DEVICE
Filed Aug. 20, 1957 6 Sheets-Sheet 5

INVENTOR
JAN ADRIANUS MANINTVELD
LEONARD JOHAN TUMMERS
BY
AGENT

March 12, 1963  J. A. MANINTVELD ETAL  3,081,418
SEMI-CONDUCTOR DEVICE
Filed Aug. 20, 1957  6 Sheets-Sheet 6

INVENTOR
JAN ADRIANUS MANINTVELD
LEONARD JOHAN TUMMERS
BY
AGENT

United States Patent Office 3,081,418
Patented Mar. 12, 1963

3,081,418
SEMI-CONDUCTOR DEVICE
Jan Adrianus Manintveld and Leonard Johan Tummers, Eindhoven, Netherlands, assignors to North American Philips Company, Inc., New York, N.Y., a corporation of Delaware
Filed Aug. 20, 1957, Ser. No. 679,288
Claims priority, application Netherlands Aug. 24, 1956
33 Claims. (Cl. 317—128)

This invention relates to transistors comprising a body in which a semi-conductive part of a given conductivity type provided with a contact, which part is referred to as the base, is spaced by means of closely opposite junctions from at least two semi-conductive parts of opposite conductivity type provided with contacts, which parts are referred to as the emitter zone and the collector zone, respectively.

It is known that a depletion layer occurs in the vicinity of a junction between two semi-conductive parts of opposite conductivity types, the density of the free charge carriers in this depletion layer being small with respect to that at an area which is a little remote from the junction. It is also known that, when a potential difference is applied in the reverse direction between the two semi-conductive parts, the depletion layer expands upon increase in the reverse potential difference, the expansion being the greater as the semi-conductive material has a higher specific resistance. It is possible to bring about the expansion of the depletion layer substantially in one of the two semi-conductive parts, viz. by choosing this semi-conductive part to be high-ohmic with respect to the other.

The object of the invention, which utilizes the action of an depletion layer, is inter alia to provide a transistor which exhibits negative resistance effects and which may be manufactured in a simple and reproducible manner.

In the transistor according to the invention, when starting from a boundary surface of the body beside the emitter contact, a non-conductive part penetrates the base, which part narrows the current path from the emitter to the base contact and approaches the collector up to a distance smaller than the minimum distance between the emitter and the collector, the arrangement being such that a negative differential resistance occurs in the characteristic curve showing the relationship between the collector current and the potential difference in the reverse direction between the collector contact and the base contact for a constant potential difference in the forward direction between the emitter contact and the base contact. The terms "emitter" and "collector" are to be understood in this case to mean the active surface of the junction separating respectively the emitter zone and the collector zone, from the base. The term "non-conductive part" is to be understood to mean a part the conductivity of which is so small that this part is not traversed by any appreciable current. Furthermore, it is assumed that the base contact is spaced from the collector over a distance larger than the distance between the emitter and the collector, as is usually the case in transistors.

The invention underlies the recognition of the fact that in this transistor, due to expansion of the depletion layer of the collector, resulting from a potential difference in the reverse direction between the base contact and the collector contact, in co-operation with the above-described non-conductive part, the remaining passage aperture in the current path from the emitter to the base contact may be considerably reduced, so that the base resistance between the emitter and the base contact upon increasing potential difference between the collector and the base contact greatly increases and with a constant potential difference in the forward direction between the emitter contact and the base contact the voltage drop across the emitter junction decreases and hence the number of the emitted charge carriers decreases, so that the collector current upon increasing potential difference in the reverse direction between the collector contact and the base contact may decrease and a negative differential resistance may occur. The effect will become manifest more distinctly as the increase in base resistance is greater with a given increase in reverse potential difference between the base contact and the collector contact.

In order to bring about a noticeable variation in base resistance, the expansion of the depletion layer is to take place substantially in the base. If the base has a high specific resistance with respect to the specific resistance of the collector zone, the expansion of the depletion layer substantially takes place in the base. In order to achieve a desired variation in the depth of penetration of the depletion layer in the base as a function of the potential difference applied across the depletion layer, it is possible for the specific resistance of the semiconductor on each side of the junction to be varied as a function of the distance from the junction.

Furthermore, the distance between the non-conductive part and the collector is preferably chosen to be such that the non-conductive part lies within reach of the depletion layer since, in this case, the variation in base resistance is maximum with a given shape of the non-conductive part. The non-conductive part is assumed to lie within reach of the depletion layer, if the depletion layer of the collector may penetrate up to the non-conductive part with a reverse potential difference between the collector contact and the base contact which is suitable for practical use. This potential difference must in any case be smaller than the breakdown voltage of the depletion layer of the collector.

A particularly suitable transistor is of the type in which any possible connecting line in the base between the emitter and the base contact approaches the collector up to a distance smaller than the minimum distance between the emitter and the collector, the non-conductive part being assumed not to form part of the base. In fact, in such a transistor, the current path from the emitter to the base contact is locally concentrated in all directions above the collector. If, furthermore, the height of passage in the local narrow part lies in all directions within reach of the depletion layer of the collector, the transistor has the special feature that, when a certain potential difference is applied between the collector contact and the base contact, the so-called cut-off voltage, the current path from the emitter to the base contact may be completely cut-off. If between the collector contact and the base contact there is applied a potential difference equal to, or greater than the cut-off voltage, the collector current has a value substantially corresponding to the reverse characteristics of the system between the emitter contact and the collector contact.

The non-conductive part must approach the collector up to a distance smaller than the minimum distance between the emitter and the collector, in order to permit a considerable variation in base resistance and also to prevent the depletion layer of the collector from reaching the emitter and thus short-circuiting these parts before the current path from the emitter to the base contact has been interrupted wholly or in part.

In a simple, particularly suitable embodiment of a transistor according to the invention, the non-conductive part lies in an annular region round the emitter zone, starting from the surface of the body around the emitter contact, while the base contact is arranged on a part of the surface of the body which lies outside the surface enclosed by this annular region. This configuration may be obtained in a simple manner by means of electrolytic etching, whereby the non-conductive part penetrates the base zone and the emitter zone, starting from a part of the surface of the body adjacent the area at which the emitter zone appears at the surface of the body.

In a certain case, it may be advantageous for the collector zone to be also surrounded by a non-conductive part.

On account of its electrical properties, the transistor according to the invention is suitable for use in switching applications, in which it may be very important for the transistor to be switched over very rapidly from one condition to the other, for example from a current condition to a substantially currentless condition. In this case, semi-conductive material is preferably used for the transistor in which the charge carriers have a period of life which is short with respect to the switching time desired in operation.

In the transistor according to the invention, of the semi-conductors germanium and silicon, which hitherto have usually been employed for transistors, the material silicon is preferred, since this semi-conductor permits of obtaining a reverse current lower than that obtainable with germanium, while silicon is also more favorable on account of its lower sensitivity to temperature.

The non-conductve region may be formed by a cut provided in the body by etching or by means of a mechanical operation, for example by sawing, grinding or drilling. It might be possible that the mechanical structure of the transistor is considerably weakened by the cut. In this case, the transistor is preferably surrounded by an insulating material, for example silicone lacquer, which strengthens the structure without detrimentally affecting the performance of the transistor.

However, as an alternative, the non-conductive region may be constituted by a semi-conductive part which is high-ohmic with respect to the semi-conductive base.

A particular method according to the invention for the manufacture of a transistor as above described, consists in that, after at least the emitter zone and the emitter contact have been provided on the base, the whole is subjected to an electrolytic etching treatment with the use of an etching agent constituting a low-ohmic transition with the material of the emitter zone and a high-ohmic transition with the material of the base zone, the emitter contact being used as an electrode and part of the emitter zone and an adjoining layer being removed from the base. It is thus possible to obtain a cut round the emitter zone which penetrates the base from a part of the surface of the body adjacent the area at which the emitter zone appears at this surface. In this case it is even possible to remove material from under the emitter contact as a function of the duration of the etching treatment. It will be evident that, during the etching treatment, those parts of the transistor which must not be chemically attacked by the etching agent, for example the base contact, are masked.

In the manufacture of a transistor, the semi-conductive emitter zone of which consists of p-type silicon, the etching agent preferably used is an aqueous hydrofluoric solution, a positive voltage with respect to the etching bath being applied to the emitter contact. It has also been found that, if an alcohol, for example ethyl alcohol, is added to the etching bath, the etching process under otherwise similar conditions confines itself less selectively to the p-type silicon and the cut becomes wider and penetrates the base over a greater depth. A favorable composition of the etching bath is, for example, 1 volume part of ethyl alcohol with 1 volume part of 48% aqueous hydrofluoric solution.

In the manufacture of a transistor, the emitter zone of which consists of p-type germanium, use is preferably made of an aqueous solution of potassium hydroxide, a positive voltage with respect to the etching bath being applied to the emitter contact.

It has also been found that, if moreover a potential difference in the reverse direction is maintained between the collector contact and the base contact during the electrolytic etching treatment, so that the depletion layer of the collector penetrates the base over a certain distance, the cut can penetrate the base only up to the depletion layer. In the manufacture of a transistor in which it must be possible for the current path from the emitter to the base contact to be cut-off wtih a predetermined potetnial difference across the collector junction such as is desired in operation, this effect is utilized by maintaining this desired potential difference between the base contact and the collector contact during the electrolytic etching treatment, which usually requires the use of a separate voltage source. The etching treatment is then continued at least until the cut has reached the depletion layer. A similar result is obtained by maintaining said potential difference between the emitter contact and the collector contact, since the voltage drop across the emitter junction, which in this case is polarized in the forward direction, is negligible.

A particularly simple method according to the invention consists in that a potential difference equal to the desired cut-off voltage is maintained as the etching voltage between the emitter contact and the collector contact.

Not only the depth of penetration of the aperture into the base is important for the performance of the tranisistor, but also the lateral expansion of the cut under the emitter contact, which is substantially unavoidable with the above-described electrolytic etching tretament. This lateral expansion must usually be limited as far as possible, since it results in a reduction of the emitter size. During the electrolytic etching treatment in which the depth of penetration obtainable is determined by maintaining a potential difference across the collector depletion layer, an indication about this lateral expansion may be found by testing the current through the base contact. To avoid any further unnecessary lateral expansion from the moment when the cut has reached the depletion layer, the electrolytic etching treatment is terminated at the moment when the current through the base contact, after an initial gradual decrease, assumes a substantially constant value.

In a certain case, another simple indication about the later expansion may be found in the variation in etching current with a constant etching voltage. For when an electrolytic blocking layer forms between the electrolyte and the material of the emitter contact, as is the case, for example, with aluminum in an aqueous hydrofluoric solution, this indication may be found by testing the variation in etching current with constant etching voltage, the variation in etching current, after the blocking layer has formed, then being substantially determined by the size of the semi-conductive surface which is subject to etching. The electrolytic etching treatment of a transistor of which a part of the emitter zone opposite the collector is plane in an etching agent forming a blocking layer with the material of the emitter contact, is preferably terminated at the beginning of the time interval in which the etching current greatly decreases for the second time. Such a case occurs, for example, in electrolytic etching in an aqueous hydrofluoric solution of a transistor, the semi-conductor of which consists of silicon and the emitter zone and the emitter contact of which are obtained by alloying thereon a quantity of aluminum. This will be explained more fully hereinafter in the description.

The invention also relates to a radiation-sensitive device. It has for its object to provide a radiation-sensitive device which is extremely sensitive to irradiation and which exhibits a very favourable ratio between the collector current upon irradiation and the collector current without irradiation.

Said device contains the above-described transistor in which a potential difference temporarily occurs across the depletion layer of the collector such that the current path from the emitter to the base contact is interruped at least in part in the absence of radiation. Such a potential difference across the depletion layer of the collector may be produced, for example, by maintaining a potential difference at least equal to the cut-off voltage $V_{ec}$ between the base contact and the collector contact or between the emitter contact and the collector contact.

The invention is based on the discovery that in a transistor in which the current path from the base contact to the emitter is interrupted, the cut-off condition can be eliminated by irradiation with rays of a wavelength such that additional free charge carriers are excited in the base of the transistor, and more particularly in the collector depletion layer. The irradiation is preferably effected on the emitter side of the transistor where the non-conductive part is situated. The collector circuit preferably includes a resistor.

The device according to the invention is suitable more particularly as a radiation-sensitive switching relay, if a relay is included in the base circuit and/or the collector circuit and/or the emitter circuit.

The invention also relates to a circuit utilising a transistor of the kind above described. The invention may be used with great advantage in circuits in which so high a potential difference temporarily occurs across the collector depletion layer that the current path between the emitter and the base contact is interrupted at least in part, so that the input resistance between the emitter contact and the base contact considerably increases. Particular uses will be discussed more fully hereinafter.

The various aspects of the invention will now be explained in detail with reference to a number of examples clarified by means of schematic figures.

FIG. 7 shows characteristic curves of the transistor of FIG. 6.

FIG. 8 and 9 are a plan view and a sectional view respectively of a third embodiment of a transistor according to the invention.

FIGS. 10 to 13 are sectional views of other embodiments of a transistor according to the invention.

Figure 1:
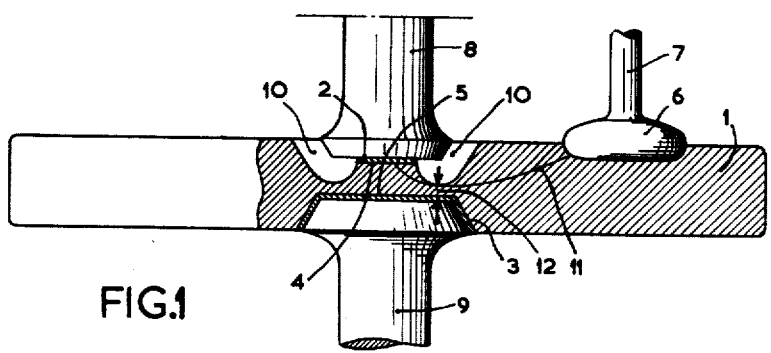
FIG. 1 is a sectional view of a transistor according to the invention.

The disc-shaped semi-conductive part of the alloy junction transistor shown in section in FIG. 1 comprises a base 1, an emitter zone 2 and a collector zone 3. The emitter 4 and the collector 5 are the active rectifying junctions separating the emitter zone 2 and the collector zone 3, respectively, from the base 1 arranged on the emitter side of the disc is a base contact 6, to which a supply wire 7 is secured. Contacts with the emitter zone 2 and the collector zone 3 are formed by alloyed amounts of metal 8 and 9, to which supply conductors may be secured. Apart from the base contact, the transistor shown in FIG. 1 exhibits circular symmetry. Starting from the boundary surface of the transistor body adjacent the emitter contact, a cut 10 is provided, which surrounds in an annular region the emitter zone 2 and which narrows the current path from the emitter 4 to the base contact 6. This cut should not be confounded with the known groove which is obtained if in a transistor the area at which a junction appears at the surface, is subjected to an after-etching process, for that groove penetrates the transistor body to a smaller extent than does the emitter and hence has no importance for any resistance effects. The base contact 6 occupies a part of the base surface located outside the surface of the body enclosed by the cut. In this transistor, any possible connecting line 11 in the base between the emitter and the base contact approaches the collector 5 up to a distance, indicated by 12, smaller than the minimum distance between the emitter 4 and the collector 5. If the base has a high specific resistance with respect to the specific resistance of the collector zone, the depletion layer substantially penetrates the base. If it is desired to obtain the effect that the current path between the emitter and the base contact is interrupted for a certain potential difference across the collector junction, the whole periphery of the non-conductive part in the narrowed position 12 must be located within reach of the depletion layer. The term "narrowed position" is to be understood to mean the narrowest portion of the current path in the base, which is also indicated by arrows in FIG. 1.

This transistor may be manufactured, for example, in the following manner:

A circular semi-conductive disc consisting of n-type silicon having a diameter of about 2500 microns and a specific resistance of 4 ohm-cm., is sawn from a monocrystalline rod and etched to a thickness of about 300 microns in an etching bath containing 15 ccs. of glacial acetic acid, 15 ccs. of 48% aqueous hydrofluoric solution and 25 ccs. of fuming saltpetre acid. Two aluminum wires each having a diameter of 300 microns are fixed opposite one another at the centre of the disc by means of a carbon jig, while a small ball of about 500 microns in diameter consisting of an alloy of 3 parts by weight of gold and 1 part by weight of antimony is arranged on one side of the disc. The assembly is subsequently heated for some minutes in a flowing gas mixture of hydrogen and nitrogen at a temperature of about 700° C. After cooling to room temperature, the emitter and collector zones, which are of p-type material and formed by a fusion or alloy process, and their contacts have formed. The base contact, which is an ohmic connection to the base region, is now masked, for example, with the aid of a solution of polystyrene in toluene, the whole subsequently being subjected to an electrolytic etching treatment in an etching bath containing one part of 48% aqueous hydrofluoric solution with two parts of ethyl alcohol. The aluminum wire of the emitter zone has applied to it a positive voltage with respect to a platinum electrode placed in the electrolyte at a small distance from the transistor. The electrolyte constitutes a low-ohmic transition with the p-type silicon of the emitter zone and a high-ohmic transition with the n-type silicon of the base, so that material of the emitter zone and an adjoining layer of the base are removed by etching. The cut penetrates the emitter zone and the base zone, starting from that part of the surface of the body which is adjacent the area at which the emitter zone appears at the surface of the body. The etching process lasts 200 seconds with an etching current of 60 milliamps, and 5 seconds with an etching current of 20 milliamps, whereupon the transistor is taken out of the etching bath. The masking is dissolved in boiling methylbenzene and the transistor is rinsed in deionized water. The collector side is after-etched for several seconds in a chemical etching bath containing 1 volume part of 48% aqueous hydrofluoric acid with 2 volume parts of fuming saltpeter acid, and subsequently rinsed. The transistor manufactured, which is shown schematically in FIG. 1, shows negative resistance effects. From a section of the transistor it has been found that the thickness of the base region between emitter and collector junctions is 70 microns and the distance between the cut and the collector in the narrowed part is 6 microns. The cut-off voltage has been found to be 35 volts.

Figure 2:
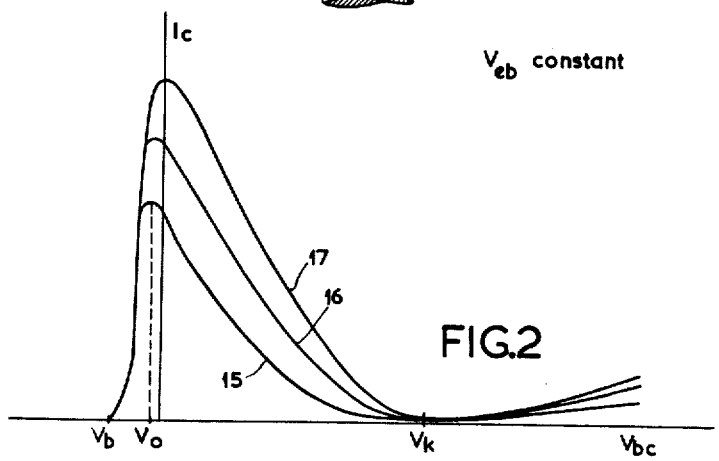
FIGS. 2 to 5 show several characteristic curves of a transistor according to the invention.

FIG. 2 shows schematically a graph of the relationship between the collector current $I_c$, which is plotted vertically in arbitrary units, and the potential difference in the reverse direction between the collector contact and the base contact, $V_{bc}$, which is plotted horizontally in arbitrary units for different values of the potential difference $V_{eb}$ in the forward direction between the emitter contact and the base contact. The value of $V_{eb}$, associated with the characteristic curves 15, 16 and 17 increases in this sequence. From $V_{bc}=V_b$ to $V_{bc}=V_o$, the characteristic curve is much similar to that of a conventional transistor. This part of the characteristic curve is only displaced to the left with respect to that of a conventional transistor due to the occurrence of an inner base resistance, which is caused by the non-conductive part and which already gives rise to a voltage difference in the reverse direction for $V_{bc}=0$ across the collector junction. From $V_{bc}=V_o$ to $V_{bc}=V_k$, a region of negative differential resistance is traversed, in which the collector current decreases upon increasing $V_{bc}$. In this region, the increase in base resistance and the resulting decrease in collector current are predominant with respect to the other factors increasing the collector current such as for example, decrease in thickness of the base. The current path from the base contact to the emitter is cut-off at the voltage $V_k$. For a collector base potential difference greater than $V_k$, $I_c$ as a function of $V_{bc}$ traverses a characteristic curve substantially similar to the reverse characteristic of the blocking-layer system between the emitter contact and the collector contact.

Figure 3:
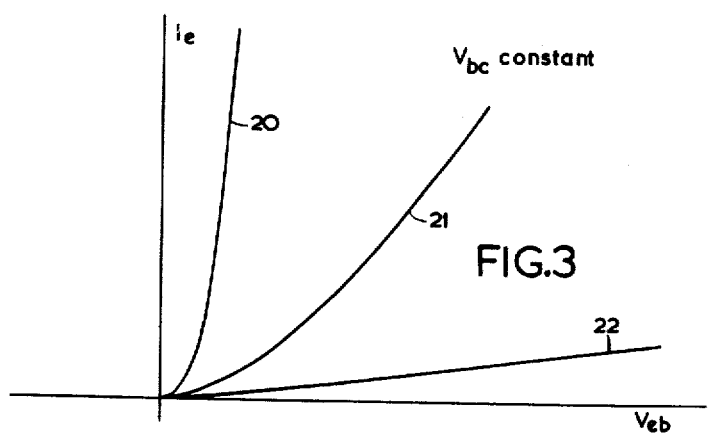

The interrupting action of the collector depletion layer also clearly appears from the graph of FIG. 3, in which the potential difference $V_{eb}$ is plotted horizontally in arbitrary units and the emitter current $I_e$ is plotted vertically in arbitrary units. The characteristic curves are given for different values of the potential difference $V_{bc}$. The characteristic curve 20, which corresponds to a potential difference $V_{bc}$, located between $V_b$ and $V_o$ (see FIG. 2) is much similar to that of a conventional transistor. The blocking action of the depletion layer is hardly noticeable. From curve 21, as compared to curve 20, it appears that in the conditions corresponding to those of curve 21, the resistance between the emitter and the base contact has increased. This curve applies to a potential difference $V_{bc}$, located between $V_o$ and $V_k$ of FIGURE 2. Curve 22 shows the conditions, for which applies $V_{bc}$ higher than $V_k$, in which the current path from the emitter to the base contact is completely interrupted by the action of the depletion layer, so that apart from a small blocking current from the base contact to the collector contact only that emitter current can occur which is passed by the blocking-layer system between the emitter contact and the collector contact.

Figure 4:
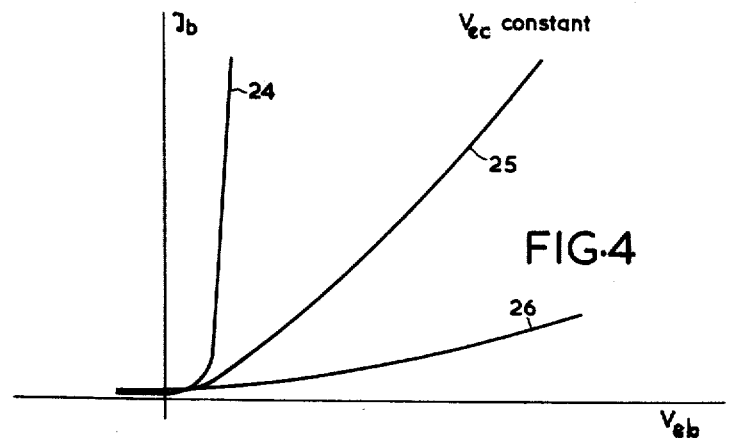
Figure 5:
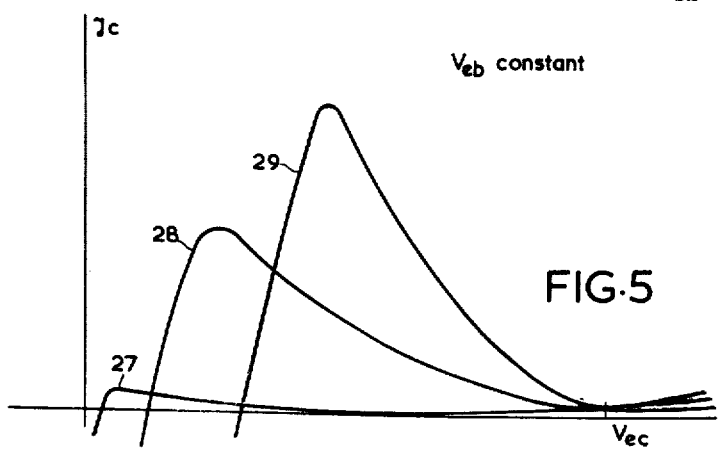

The increase in resistance of the base and the blocking of the current path from the emitter to the base contact also appears from other characteristic curves of the transistor such, for example, as those shown in FIGURES 4 and 5. In FIG. 4, the base current $I_b$ is plotted vertically and $V_{eb}$ is plotted horizontally for three constant values of the potential difference $V_{ec}$, between the collector contact and the emitter contact, at which the emitter contact is positive with respect to the collector contact. In FIG. 5 $I_c$ is plotted vertically and $V_{ec}$ is plotted horizontally for three constant values of $V_{eb}$. All the magnitudes are plotted in arbitrary units, while the parameter value of the characteristic curves associated with a figure increases in the same sequence, as the sequence of the numbers referring to the characteristic curves.

FIG. 2 shows that the negative differential resistance already occurs at a potential difference between the base contact and the collector contact which is smaller than the cut-off voltage. Consequently, if only a transistor having a negative differential resistance is desired, it is not necessary that in the transistor the current path from the emitter to the base contact can be interrupted completely. For the occurrence of a negative differential resistance, it is necessary only that the decrease in collector current resulting from the increase in base resistance is greater than the increase in collector current resulting from other factors such as, for example, the decrease in thickness of the base upon expansion of the depletion layer, the avalanche mechanism in the depletion layer, etc.

The value of the negative differential resistance, that is the slope of the characteristic curve of FIG. 2, in the voltage region between $V_o$ and $V_k$ is determined inter alia by the value $V_o$, that is the potential difference at which the collector current starts to decrease upon increasing $V_{bc}$, and the value $V_k$, that is the potential difference at which the collector current, after a decrease, again starts to increase.

These two voltages and the value of the differential resistance are substantially determined by two factors: the geometry of the cut and the specific resistance of the semi-conductor on each side of the collector junction, more particularly the specific resistance in that part of the base which is occupied by the depletion layer when the current path from the emitter to the base contact is interrupted completely or in part. The voltage $V_k$ is lower as the specific resistance of that part of the base which is located between the non-conductive part and the collector is higher and as the distance between the non-conductive part and the collector is smaller. Particular effects may be obtained by providing, for example, the specific resistance in the base to be dependent upon the distance from the collector junction. Thus, for example, that part of the base which is located between the emitter and the non-conductive part, may comprise a thin comparatively low-ohmic layer adjoining the collector, and a comparatively high-ohmic part adjoining the non-conductive part. The expansion of the depletion layer is small so long as it remains in the low-ohmic part and has little influence upon the base resistance of the transistor, whereas the expansion and hence the influence of the depletion layer upon the base resistance may be much greater for a potential difference greater than the potential difference at which the depletion layer reaches the high-ohmic part.

Figure 6:
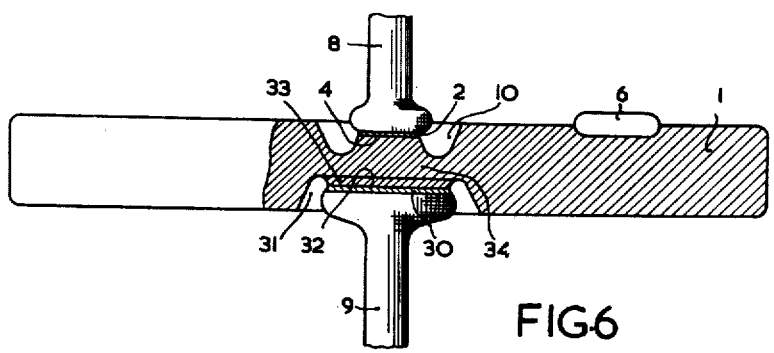
FIG. 6 is a sectional view of another embodiment of a transistor according to the invention.

It may also be advantageous to surround the collector by a non-conductive part. In the transistor shown in FIG. 6, both the emitter zone 2 and the collector zone 30 are surrounded by cuts 10 and 31, respectively, the cut 10 surrounding the emitter being located within reach of the collector depletion layer. The part of the base 1 located between the emitter 4 and the collector 32 comprises a comparatively low-ohmic portion 33 and a comparatively high-ohmic portion 34. The low-ohmic portion 33 of the base is laterally surrounded completely by the cut 31, provided on the collector side. The initial expansion of the depletion layer, which is comparatively small in the low-ohmic part 33, has no influence upon the base resistance so long as the depletion layer remains in this low-ohmic part. However, as soon as the depletion layer penetrates the high-ohmic portion 34, the expansion of the collector depletion layer influences the base resistance. Consequently, the transistor of FIG. 6 may show $I_c-V_{bc}$ characteristic curves at different values of $V_{eb}$, as shown diagrammatically in FIG. 7. In this figure, all values are plotted in arbitrary units. These characteristics 40, 41 and 42, the associated $V_{eb}$-value of which increases in this sequence, correspond to analogous characteristic curves of a conventional transistor in a larger region, viz. between $V_b$ and $V_o$, than the characteristic curves 15, 16 and 17 of FIG. 2.

As a rule, it may be assumed that any desired functional relationship between the expansion of the depletion layer in the base and the potential difference applied to the depletion layer may be achieved by providing for the specific resistance of the semi-conductor in the base and in the collector zone to be dependent in a suitable way. By suitable choice also of the shape of the cut, it is possible to obtain a negative differential resistance of any desired value.

Now, several further embodiments of a transistor according to the invention will be described.

FIGS. 8 and 9 show a plan view and a cross-sectional view, respectively, of a transistor, the emitter contact 8 and the emitter zone 45 of which are surrounded by a cut 46 which is interrupted over a short distance on the side remote from the base contact 6. When the depletion layer expands to the cut 46, the current path from the emitter 47 to the base contact 6 is not interrupted completely, but interrupted substantially. The decrease in collector current upon increase of $V_{bc}$ in this case takes place at a lower rate than when the emitter portion is surrounded completely by the cut, as is the case in FIG. 1.

In the transistor shown in FIG. 10, the non-conductive part 50, which is of insulating material or an intrinsic semi-conductor, surrounds in annular form the emitter zone 51, approaching collector 5 up to a distance smaller than the distance from emitter 52 to collector 5. In contradistinction to the transistor shown in FIG. 1, the non-conductive part 50 lies completely inside the base 1.

Figure 11:
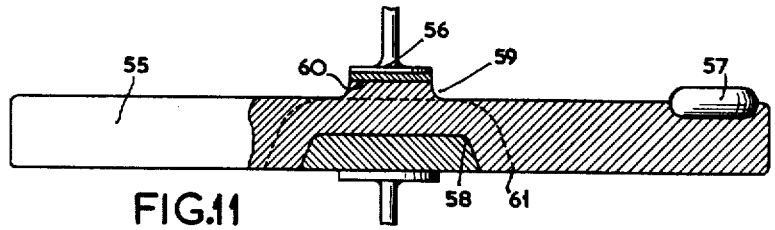

In the transistor shown in FIG. 11, the base 55 beside the emitter contact 56 is partly removed from the emitter side of the transistor, for example by means of etching. The base contact 57 is arranged on the locally thin part of the base at a distance from collector 58 which is larger than the minimum distance between the collector and the cut 59. The current path from emitter 60 to base contact 57 is cut-off as soon as the depletion layer of collector 58 has expanded to dotted line 61.

Figure 12:
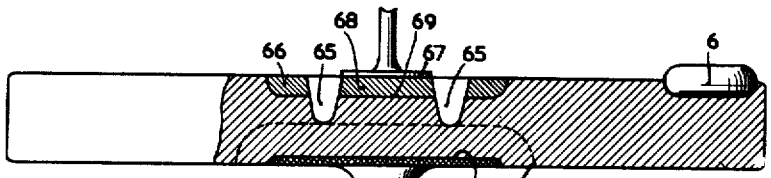

FIG. 12 shows a transistor in which a cut 65 perforates the emitter zone 66. The emitter contact 67 is arranged on a central portion 68 of the emitter zone, so that only the junction 69 of this portion of the emitter zone is active with the base as an emitter. The current path from emitter 69 to base contact 6 is cut-off at the moment when the depletion layer of collector 70 reaches the dotted line 61.

In the foregoing embodiments, the base contact is invariably shown as a local contact. It will be evident that the base contact may have all kinds of shape, for example an annular shape or U-shape. Furthermore, the base contact may usually be arranged either on the emitter side or on the collector side of the transistor.

Figure 13:
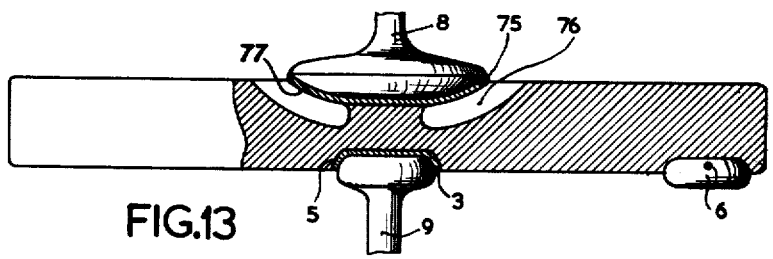

In order to obtain the cut-off effect, the collector zone or the collector contact need not be larger than the emitter zone or the emitter contact, provided the non-conductive part penetrates under the emitter portion over a depth such that the distance between the non-conductive part and the collector is smaller than the distance between the emitter and the collector. In the transistor shown in FIG. 13 the emitter portion, both the emitter zone 75 and the emitter contact 8, is larger than the collector portion, the collector zone 3 and the collector contact 9, but the cut 76 penetrates under the emitter zone over a depth such that the distance between the cut 76 and the collector 5 is considerably smaller than the distance between emitter 77 and collector 5.

For providing a cut, use is preferably made of the etching process. It is possible to provide the cut in the semi-conductive body before providing the various zones and contacts, for example by diffusion or alloying. However, a simpler method is first to provide the various zones and contacts, at least the emitter zone and the emitter contact and subsequently to subject the whole to an etching treatment.

In this case, use may be made with great advantage of the fact that certain etching agents form a low-ohmic transition with a semi-conductive material of a given conductivity type and a high-ohmic transition with the same material of opposite conductivity type. This may be clearly explained with reference to an example, viz. an aqueous hydrofluoric solution, which forms a low-ohmic contact with p-type silicon and a high-ohmic contact with n-type silicon. During the etching treatment of a p-n-p transistor, the semi-conductor of which consists of silicon, a positive voltage with respect to the etching bath is applied to the emitter contact. The selective etching process may presumably be explained as follows: The fluorine ions travel to the positive electrode where they can discharge by combination with a hole and subsequently bind themselves with locally present silicon to form silicon fluoride which is soluble in the electrolyte. Thus, the etching process substantially takes place at the area where many holes are present and hence at the surface of the emitter zone, which consists of p-type silicon, and also in a base layer adjoining the emitter, since in this layer holes are injected by the emitter due to a voltage in the forward direction being maintained across the emitter junction during the etching treatment. If necessary, the collector zone may be masked to avoid etching of the p-type collector zone.

For providing the cut, use may alternatively be made in known manner of the fact that by local irradiation of semi-conductor with radiation of a suitable wavelength, a large number of charge carriers, among which holes and electrons, are excited at the area at which the radiation is incident. Said charge carriers can discharge the etching ions and locally make possible the etching process.

Although the foregoing explanation has been given for the special example of silicon in an aqueous solution of hydrofluorine, it applies in a much more general sense, for example for etching a p-n-p transistor, the semi-conductor of which consists of germanium, with the aid of an aqueous KOH-solution.

It has also been found in etching p-n-p transistors the semi-conductors of which consist of silicon, in an aqueous hydrofluoric solution that the width of the cut and the depth of penetration of the cut into the base becomes larger as a larger amount of ethyl alcohol is added to the etching bath.

If it is desired to manufacture a blocking-layer system in which the current path from the emitter to the base contact may be interrupted at a given voltage across the collector depletion layer, use may be made of a separate voltage source to apply this potential difference, during the etching treatment between the base contact and the collector contact or between the emitter contact and the collector contact. The cut can then penetrate only as far as the depletion layer and the blocking-layer system has a cut-off voltage equal to, or substantially equal to the potential difference applied, during the etching treatment, between the base contact and the collector contact or between the emitter contact and the collector contact.

Figure 14:
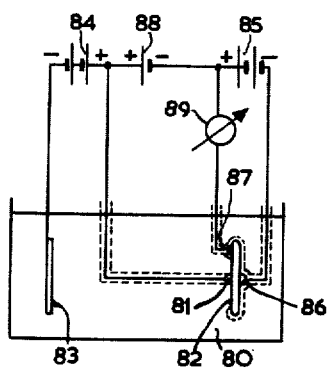
FIGS. 14 and 15 show diagrammatically devices for the electrolytic etching of a transistor according to the invention.

Furthermore, it is usually necessary to limit as much as possible the lateral expansion under the emitter contact. The etching treatment is preferably terminated as soon as the cut has reached the depletion layer. An indication of this moment may be found by testing the base current during the etching treatment. An example of an electrolytic etching treatment in which, in addition to adjustment of the depth of penetration of the collector depletion layer, the base current is tested by means of a separate voltage source, will now be explained with reference to the diagrammatic FIGURE 14.

A p-n-p silicon alloy transistor is dipped in an etching bath containing, for example, 1 volume part of 48% hydrofluoric acid with 2 volume parts of ethyl alcohol. The supply wires to the transistor are masked, for example, with a solution of polystyrene in toluene, as well as the transistor, except the emitter contact 81 and the side 82 of the transistor, on which this emitter contact is provided. The masking is indicated in dotted lines. The etching voltage is applied between the emitter contact 81 and a platinum electrode 83, the emitter contact being connected to the positive terminal of a voltage source 84. A potential difference which determines the depth of penetration of the cut and is equal to the desired cut-off voltage of the transistor is applied between collector contact 86 and base contact 87 by means of a separate voltage source 85. The cut can penetrate only as far as the depletion layer, even if the etching treatment is continued for a long time. After the cut has reached the depletion layer, it further expands only laterally under the emitter contact due to the emitter zone and the contiguous base layer between the emitter contact and the depletion layer being etched away more and more. In order to obtain an indication of the moment when the cut reaches the depletion layer, a voltage source 88, which maintains a constant potential difference is arranged between base contact 87 and emitter contact 81 in series with an ammeter 89, which indicates the base current. The emitter contact is connected positively with respect to the base contact. Accordingly as the cut approaches the depletion layer, the base resistance increases and the base current decreases more and more. From the moment at which the cut contacts with the depletion layer throughout its periphery, the current path from the emitter contact to the base contact is cut-off and the base current assumes a substantially constant value. The etching treatment is thus preferably terminated at the moment when the base current, after an initial decrease, assumes a substantially constant value. It is to be noted that the base current may be tested and the moment when the etching treatment is to be terminated may be determined in the same manner if the etching voltage is applied between the emitter contact and the collector contact and, instead of the platinum electrode 83, the collector contact, which in this case is not masked, is used as the cathode.

Figure 15:
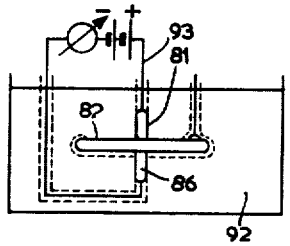
Figure 16:
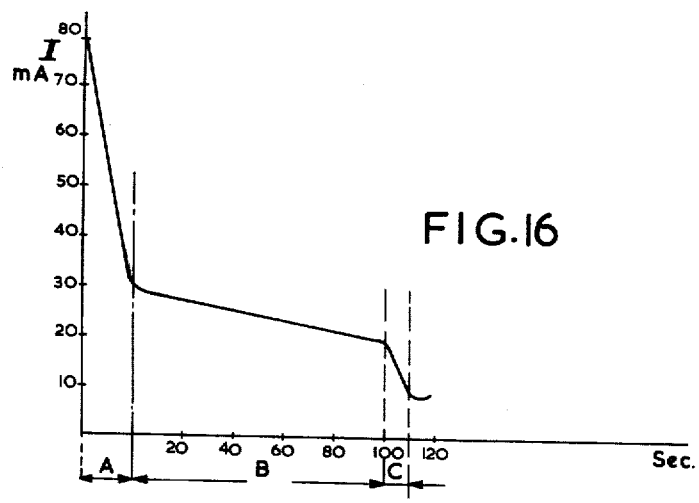
FIG. 16 shows a graph of the variation in current during the etching process.

If, during the etching treatment of a transistor, the etching agent and the material of the emitter contact are such, that a blocking layer forms between them during etching, another simple indication about the lateral expansion may be found in the variation in etching current at constant etching voltage. This will be explained more fully with reference to the example shown in the diagrammatic FIGURE 15, in which a silicon p-n-p transistor is etched electrolytically, the emitter contact and the emitter zone of which have been obtained by alloying thereon a quantity of aluminum. An etching bath 92 (see FIG. 15) consisting of 1 volume part of 48% aqueous hydrofluoric acid and 1 volume part of ethyl alcohol contains a silicon p-n-p transistor manufactured in the manner previously described in detail and the supply wires of which are led from the etching bath to the exterior. Except for part of the collector contact 86, the emitter contact 81 and the transistor surface 82 adjacent the emitter contact, the transistor and its supply wires are covered with a mask as shown in dotted lines in FIG. 15. The desired cut-off voltage, for example 15 volts, is maintained as the etching voltage between emitter contact 81 and collector contact 86, the emitter contact 81 being positive with respect to collector contact 86. The etching current which occurs is composed of three contributions: The useful etching current, which from supply wire 93 and the emitter contact penetrates the emitter zone and the base, subsequently reaches the etching bath 92 through the boundary surface 82 of the transistor adjacent the emitter contact and then flows via the etching bath to the collector contact 86. This contribution is directly proportional to the semi-conductive surface subject to the etching treatment. Furthermore, there flows a current through the etching bath directly from emitter contact 81 to collector contact 86. This contribution is considerable upon switching-on, but decreases within ten seconds, which is the time it takes to provide the aluminum wire with an aluminum oxide film of poor conductivity, to a further constant value, which in this case is approximately 8 milliamps. Finally, a current flows through the transistor from the emitter contact to the collector contact, but the value of this contribution (in this case about 0.1 μa.) is negligible with respect to the other contributions. The variation in the total etching current during the etching treatment with a constant potential difference applied between the emitter contact and the collector contact is determined only by the geometry of the emitter portion of the transistor when an electrolytic blocking layer has formed between the emitter contact and the etching bath. The collector portion (9, 3) of FIG. 1 is an example of an aluminum alloy contact on silicon. The whole has the shape of a truncated cone or pyramid, of which a thin layer 3 on the plane upper side and on the side constitutes the recrystallized semi-conductive zone, the remaining portion 9 being occupied by the conductive contact which consists of aluminum and a small content of silicon. FIG. 16 shows the etching curve for etching such an aluminum contact of the emitter at a constant voltage, the duration of the etching treatment being plotted horizontally in seconds and the value of the total etching current in milliamps. being plotted vertically. During the time interval A, the etching current decreases fairly rapidly which is attributable to the formation of the oxide film on the aluminum contact of the emitter. During this time interval, the emitter zone and the adjoining base zone are etched. As the etching treatment proceeds, the shape of the etching curve is determined only by the contribution of the useful etching current, since the other contributions have become constant. At the beginning of the time interval B, the etching treatment has advanced to about a quarter of the side flanks of the emitter zone. During the time interval B (10–100 seconds), the emitter zone and the base layer are etched away up to the plane portion of the emitter zone. The etching current decreases slowly as a result of the gradual reduction of the surface which is subject to etching. From the moment when the etching under the emitter zone starts, the etching current decreases much more rapidly, since the surface which is subject to etching becomes smaller more rapidly. It is to be noted in this connection that the width of the groove already etched remains substantially constant. At the end of the time interval C, the emitter contact is completely separated by etching from the base.

On the ground of the foregoing, it will be evident that the etching treatment is preferably terminated at the beginning of the time interval C, during which the etching current considerably decreases for the second time.

It is to be noted that, although the exact values given in the etching curve of FIG. 16 are valid only for the case above described, the shape of the etching curve may be found back in the more general case in which a transistor, a considerable portion of the emitter zone of which is plane, is etched in an etching agent forming a blocking layer with the material of the emitter contact. The same feature may be utilized for determining the moment when the etching treatment is preferably terminated.

It is also pointed out that this indication is neither limited to the case in which the etching voltage is applied between the emitter contact and the collector contact, but that it is also applicable in a more general case, for example if a platinum electrode instead of collector contact 86 is used as the cathode and the emitter contact is used as the anode.

Figure 17:
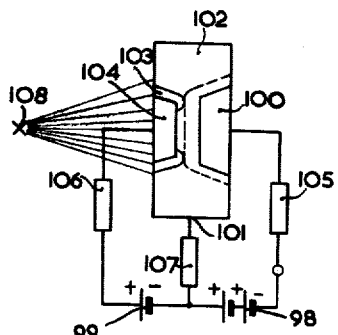
FIG. 17 shows a schematic diagram of a radiation-sensitive device according to the invention.

The operation of the radiation-sensitive device according to the invention will now be explained with reference to the schematic diagram of FIG. 17. Between a collector contact 100 and a base contact 101 of a transistor 102 according to the invention, which is assumed to be of the p-n-p type, there is applied by source 98 a potential difference in the reverse direction such that in the absence of radiation the depletion layer of the collector reaches the non-conductive portion 103 (for example in the dotted position) and the current path from emitter contact 104 to base contact 101 is cut-off. A potential difference in the forward direction is maintained between emitter contact 104 and base contact 101 by a source 99. Loads 105, 106 and 107 are shown in the collector circuit, the emitter circuit and the base circuit, respectively. The transistor is in the cut-off condition and there is substantially no flow of emitter current, collector current and base current.

Radiation emerging from a radiation source 108 is caused to strike the emitter side of the transistor on which the non-conductive part is provided. The radiation has the effect of exciting additional free charge carriers in the base, resulting in an increased collector current $I_c$. This increase of $I_c$ results in an increased voltage drop across the load 105, so that the potential difference across the depletion layer of the collector decreases. This results in a decrease in the expansion of the depletion layer and hence a decrease in the inner base resistance of the transistor. Since the voltage drop across the inner base resistance also decreases, the potential difference across the emitter junction which is in the forward direction increases, so that the emitter current can initially increase. The increase in emitter current results in an increase in collector current and this in turn results in an increased voltage drop across the load 105, which leads to a decrease in the inner base resistance, etc. This mechanism finally results in a condition of equilibrium in which the blocking of the transistor may be completely suppressed and in which considerably larger currents can occur than in the cut-off condition.

It is clear that for obtaining such an ON-condition of the device the duration of the radiation pulse should exceed the switching on time of the device. When the radiation source 108 is removed, the contribution of the excited charge carriers to the collector current disappears. The voltage drop across the load 105 thus decreases and the expansion of the depletion layer increases, etc. The above-described mechanism is now repeated in the reverse sequence until the initial cut-off condition is reached. The type of radiation to which the device responds is dependent on the choice of the semi-conductive material and its preparation.

Apart from its use as a detector, the radiation-sensitive device according to the invention is suitable more particularly as a radiation-sensitive switch. The collector circuit or the emitter circuit or both circuits and, if desired, also the base circuit, in this case, include one or a plurality of relays which cannot be energized by the low currents occurring in the cut-off condition and which can be energized by the comparatively high currents occurring in the released condition. The above-described mechanism is greatly influenced in a favorable sense if the collector circuit includes a high-ohmic load resistor 105, for example 10 KΩ, and the load resistor 107 in the base circuit has a low value.

As will be evident from the foregoing description desired operation of the switching circuit is obtained by a suitable choice of circuit components and operating voltages. For instance, the collector bias is preferably chosen so that the depletion layer reaches the non-conductive area thereby producing the high resistance base-region described in the emitter base circuit. The emitter forward bias is preferably chosen so that, under these circumstances, most of the voltage appears across the high resistance base region and the voltage across the emitter junction is below the value at which any significant injection of minority carriers obtains. For highest sensitivity the emitter bias is chosen as high as possible but just below the value at which the device is switched on even in the absence of incident radiation. It will be obvious that considerable variation of the transistor and the circuit parameters is of course possible within the scope of the broad concepts of the invention. Moreover, it will be seen that for the radiation sensitive switch illustrated in FIGURE 17, to operate as described the duration of the radiation or illumination must equal or even exceed the switching-on time of the device, i.e. the time for the switch to pass from the OFF to the ON condition.

The negative differential resistance obtained in the characteristic curves shown in FIGS. 2 and 7 may be used for all kinds of known purposes, such as for reducing the damping of an electric load, for producing oscillations, for example sinusoidal, sawtooth or pulsatory oscillations, for realizing bistable or monostable trigger circuits, combined amplifier and trigger circuits etc. It is also possible by suitable choice of the collector voltage collector impedance and/or design of the input circuit to provide a condition wherein low base voltages are amplified by the transistor but wherein, at a base voltage at which the cut-off voltage $V_k$ is exceeded, the transistor is blocked in a manner such that a signal source connected to the base contact is also decoupled.

Figure 23:
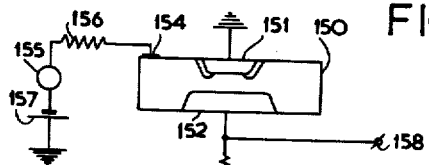

FIG. 23 shows an example of a bistable trigger circuit in which a transistor 150 of the type specified before is used. The emitter contact 151 of the transistor 150 is connected to ground and its collector 152 connected through a load resistor 153 to a source of supply voltage which is adjusted to a value $V_\beta$ which is slightly more negative than the cut off (pinch off) voltage $V_k$ specified before. The base contact 154 is connected to a source of trigger pulses 155 having an interval resistance 156. A small negative bias potential source 157 may be inserted in the base lead. An output voltage is produced at terminal 158 connected to the collector contact 152.

In operation a negative trigger pulse applied to the base contact 154 results in a decrease of the collector to base voltage to a value lower than said cut off voltage $V_k$. As a consequence thereof the emitter to base conducting path is unblocked. At the same time said negative trigger pulses bias the emitter to base-junction in the forward direction so that emitter current begins to flow. This emitter current produces a corresponding collector current which develops a voltage drop across resistor 153 further to decrease the collector to base potential.

Consequently said negative trigger pulses provide a switching of the transistor 150 from its OFF into its ON condition. If, however, positive switching pulses are applied to the base contact 154 the emitter to base junction is biased in the reversed direction and all currents in the transistor 150 cease to flow. This results in a collector to base voltage larger than said cut-off voltage $V_k$ and the transistor is switched into its OFF condition.

This differential resistance is short-circuit stable, that is to say, self-oscillation only occurs if the resistance included between the collector contact and the base contact exceeds a prescribed value. This naturally does not mean that the transistor can be used only in common base connection. In common emitter connection also it is possible to measure such negative resistance effects on the collector contact and the base contact, respectively.

Figure 18:
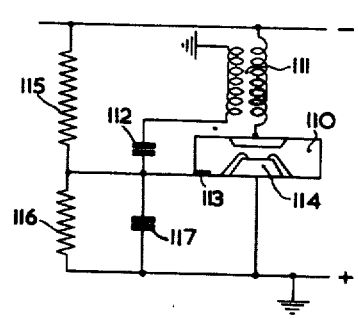
FIGS. 18, 19 and 23 show circuit diagrams in which a transistor according to the invention is used.

In addition to the direct use of the relevant negative differential resistance by including a two terminal impedance in one circuit between the transistor contacts, it is also possible to include a feedback four terminal network between the transistor contacts and thus realize special additional effects. FIG. 18 shows an oscillator circuit which utilises the property that the voltage $V_k$, a magnitude given for a certain transistor, is substantially independent of, for example, the supply voltage and temperature.

The collector circuit of transistor 110 includes a feedback transformer 111, the secondary of which is connected, in series with a capacitor 112, between a base contact 113 and an emitter contact 114. The required forward voltage for the base is produced by means of series resistors 115—116. A further capacitor 117 may be connected, if necessary, between base contact 113 and emitter contact 114, in order to ensure proper impedance-matching to the base circuit.

Due to the feedback through transformer 111, the circuit is caused to self-oscillate, the frequency of the oscillation produced being determined by the tuning of the circuit comprising the secondary winding of transformer 111 and the capacitors 112 and 117. The amplitude of this oscillation is limited on the one hand due to the collector-emitter voltage $V_{ec}$ decreasing to a saturation value such that the transistor substantially no longer amplifies and on the other hand due to this voltage $V_{ec}$ approaching the cut-off voltage $V_k$ so closely that the resultant increased base input resistance, as a result of blocking of the current path between the base contact and the active base zone, brings about a damping of the resonant circuit 111—112—117 such that the oscillation does not build up higher. The term "active base zone" is to be understood as designating the region of the base located in the electrical sense between the emitter and the depletion layer of the collector. An oscillator is thus obtained which delivers an oscillation of substantially constant voltage amplitude.

Figure 19:
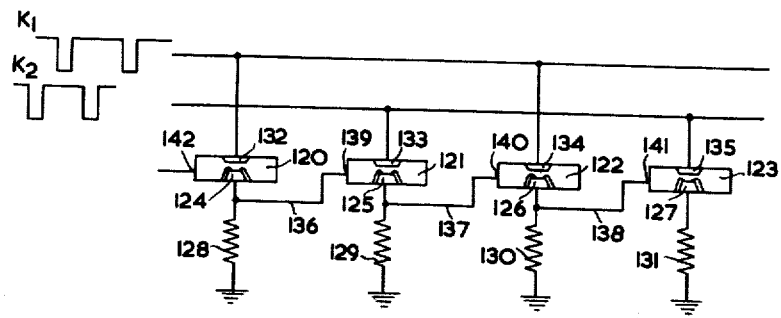

FIG. 19 shows an example of a circuit in which use is made of the fact that, if the collector voltage exceeds the value $V_k$, the active base zone is at floating potential.

The transistors 120, 121, 122 and 123 are in this case used as memory elements in a device for temporary storage of coded information. The emitter contacts 124, 125, 126 and 127 of the transistors, which are assumed to be of the p-n-p type, are connected via resistors 128, 129, 130 and 131 to earth, their collector contacts 132, 133, 134 and 135 being fed by negative control pulses, "clock pulses," $K_1$ and $K_2$, respectively, which occur at different moments and which have either earth potential or a low positive potential with respect to earth during the intervals between the pulses. The generators for producing these pulses have a substantially negligible interval impedance. The amplitude of the pulses produced is greater than the cut-off voltage $V_k$ of the transistors. The emitter contacts 124, 125 and 126 are connected via connections 136, 137, 138, which are conductive in both directions, to the base contacts 139, 140 and 141 of the subsequent transistor. The device operates as follows: Assuming that a free charge content is produced in the base zone of transistor 120, for example by making base contact 142 temporarily negative with respect to emitter contact 124, a current is passed from the emitter to the collector at the moment when the clock pulse $K_1$ occurs. This current produces across resistor 128 a voltage drop which gives rise to a current pulse via the connection 136 through the base contact and the base 139 of transistor 121. Since the collector contact 133 of transistor 122 then has earth potential (the clock pulse $K_2$ occurring at moments different from the clock pulse $K_1$), this base current pulse flows not only through the emitter 125, but for an important part, if not for the greater part, through the collector 133 of transistor 121.

Said current pulse produces a large number of free charge-carriers in the form of pairs of electron-holes in the base of transistor 121.

After the clock pulse $K_1$ has ended, the current pulse through the base of transistor 121 also ceases. A free charge contents of the base zone is, however, maintained during the recombination time of the pairs of electrons and holes.

At the moment when the clock pulse $K_2$ occurs, whereby the collector contact 133 of transistor 121 is made negative, this free charge content in the base of this transistor permits passage of current from the emitter to the collector, resulting in a voltage drop across resistor 129 which is substantially equal to the clock pulse $K_2$, so that a corresponding current pulse traverses via the connection 137 the base of transistor 122. Since the clock pulses $K_1$ and $K_2$, respectively, have an amplitude greater than the voltage $V_k$, at which the base contact is no longer in conductive connection with the active portion of the base zone, a forward voltage becomes active via the junction between the emitter and the base, so that the emitter again injects holes in the base zone. Thus, during the occurrence of the clock pulses, free charge-carriers travelling out of the active base zone to the collector are resupplied by the emitter.

The first free charge carriers present in the base zone of transistor 120, after the occurrence of the clock pulse $K_1$, thus has produced free charge carriers in the base zone of transistor 121 and this, in turn, after the occurrence of the clock pulse $K_2$, has produced free charge carriers in the base zone of transistor 122. After the occurrence of the clock pulse $K_1$, which is also supplied to the collector of transistor 122, free charge carriers are thus produced in the base zone of a subsequent transistor, etc. This free charge carrier content of the base zones, which fulfills the function of a positive memory characteristic, is thus passed after each clock pulse to the subsequent transistor. If one or more of the transistors have no free charge contents in their base zones, a current pulse is not supplied to the base of the subsequent transistor, so that a negative memory feature is passed to the subsequent transistor.

The device is thus suitable as a shift register. When a charge content, free or not free, is impressed successively on the base of transistor 120 in accordance with a determined code, this information shifts to the subsequent memory elements by the action of the clock pulses. If desired, it is also possible for a free charge content to be impressed simultaneously, in accordance with a determined code, for example, on the base contacts of a plurality of transistors, for example by supplying a negative pulse to each of the relevant base contacts, whereafter the information thus recorded in the register shifts on one further memory element after the occurrence of each clock pulse.

Figure 20:
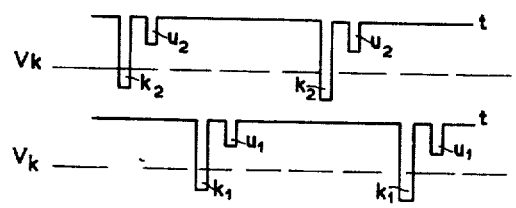
FIGS. 20, 21 and 22 show several forms of voltage pulses used therein.
Figure 21:
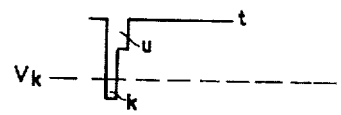
Figure 22:
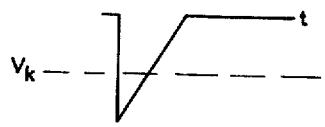

In the foregoing description, it has been assumed that the free charge content of each transistor has already disappeared within the time interval between two clock pulses supplied to one transistor. This would mean that this time interval would have to be approximately equal to said recombination time. However, it is frequently desirable for this free charge content to be suppressed already earlier. For this purpose, the clock pulses $k$ of FIG. 20 may be followed by erasing pulses U of an amplitude smaller than $V_k$, so that the remaining free charge content is rapidly extracted. As an alternative, these clock pulses may be of a trapezoidal shape (see FIG. 21) or a sawtooth shape having a steep front flank (FIG. 22).

This results in a considerable saving of switching elements, since blocking rectifiers for keeping the base at floating potential such as are necessary in an arrangement comprising conventional transistors may be dispensed with. It will be evident that other variants, for example the combination of transistors of the type specified with magnetic cores fulfilling the function of memory elements or with rectifiers, may also be realized.

It will be evident that the invention is not limited to transistors having only two rectifying contacts and an ohmic contact, but also applies to blocking-layer systems having more contacts, which exhibit a configuration similar to the above-described transistor.

What is claimed is:

1. A semi-conductor device comprising a semi-conductive body having opposed closely spaced emitter and collector junctions defining emitter, collector and base regions, connections to said regions, and a substantially non-conductive region in said base region interposed between the emitter region and the base connection and approaching the collector junction up to a distance smaller than the minimum distance between emitter and collector junctions thereby narrowing the current path between the emitter junction and the base connection such that said current path is within reach of and its conductivty thus subject to modification by a depletion layer extending from the collector junction, whereby the device exhibits a negative-resistance characteristic.

2. A semi-conductor device as claimed in claim 1, wherein the shape and dimensions of said non-conductive region and the resistivity of the base region are such that at a certain reverse potential across the collector junction the current path between emitter region and base connection is effectively blocked by the said depletion layer.

3. A semi-conductor device as claimed in claim 2, wherein the said substantially non-conductive region has an annular shape, and surrounds the emitter region, and extends toward the collector within reach of the collector depletion layer.

4. A transistor comprising a semi-conductive body having closely-spaced, opposed emitter and collector junctions defining, in the order named, an emitter region, a base region and a collector region and a current path between the emitter and collector junctions, a base connection to said base region at an area outside the emitter-collector current path, and a substantially non-conductive region in said base region interposed between the emitter region and the base connection such that any possible current path between the emitter junction and the base connection includes the portion of the emitter-collector current path adjacent the emitter and nearly up to the collector so that it is within reach of and its conductivity thus subject to modification by a depletion layer extending from the collector junction, whereby the device exhibits a negative-resistance characteristic.

5. A transistor as set forth in claim 4, wherein the resistivity of the base region is higher than that of the collector region whereby any depletion layer formed at the collector junction lies predominantly inside the base region.

6. A transistor as set forth in claim 5, wherein both the base and collector region portions adjacent the collector junction possess a graded resistivity.

7. A transistor as set forth in claim 6, wherein said substantially non-conductive region approaches the collector junction up to a distance smaller than the minimum distance between the emitter and collector junctions.

8. A transistor comprising a semi-conductive body having closely spaced opposed emitter and collector rectifying junctions, defining, in the order named, an emitter region, a base region and a collector region, connections to said regions, and a substantially non-conductive region penetrating said base region starting from an area of the body adjacent the emitter connection, approaching the collector junction up to a distance smaller than the minimum distance between the emitter and collector junctions and lying within reach of the depletion layer of the collector junction, whereby the device exhibits a negative-resistance characteristic.

9. A transistor as set forth in claim 8, wherein the dimensions and shape of said non-conductive region are such that any possible current path in the base region from a forward-biased emitter junction to the base connection approaches the collector junction up to a distance smaller than the minimum distance between emitter and collector junctions.

10. A transistor as set forth in claim 9, wherein the dimensions of the non-conductive region are such that at a certain reverse potential across the collector junction the depletion layer of the collector junction effectively blocks the emitter-base current path.

11. A transistor as set forth in claim 10, wherein said substantially non-conductive region is annular and surrounds the emitter region, the base connection being arranged on an area of the body surface outside the surface of the body enclosed by this annular non-conductive region.

12. A transistor as set forth in claim 8, wherein the semi-conductive body is constituted of silicon.

13. A transistor as set forth in claim 8, wherein the non-conductive region is constituted by an aperture in the semi-conductive body.

14. A transistor as set forth in claim 13, wherein insulating material is disposed in the said aperture.

15. A transistor comprising a wafer shaped, semi-conductive body having closely spaced opposed emitter and collector junctions inside the body defining, in the order named, an emitter region, a base region and a collector region, a base connection to said base region, and an annular substantially non-conductive region in said base region and surrounding the emitter region and interposed between the emitter region and the base connection and lying within reach of the depletion layer of the collector junction, such that at a certain reverse potential across the collector junction the depletion layer of the collector junction effectively narrows the current path between emitter junction and base connection, whereby the device exhibits a negative resistance characteristic.

16. A transistor as set forth in claim 15, wherein the dimensions of said non-conductive region and the resistivity of the base region near the collector junction are such that at a certain reverse potential across the collector junction the current path between emitter junction when forward-biased and base connection is effectively blocked by the said depletion layer.

17. A transistor as set forth in claim 15, wherein the emitter and collector junctions are fused junctions and the non-conductive region is contiguous with the emitter region.

18. A transistor as set forth in claim 15, wherein a second non-conductive region surrounds the collector region.

19. A transistor arrangement comprising a wafer-shaped, semi-conductive body having closely-spaced, opposed emitter and collector rectifying junctions inside the body defining, in the order named, an emitter region, a base region and a collector region and a current path between the emitter and collector junctions, a base connection to said base region at an area outside the emitter-collector current path, an annular substantially non-conductive region in said base region and surrounding the emitter region and interposed between the emitter region and the base connection such that any possible current path between the emitter junction and the base connection includes the portion of the emitter-collector current path adjacent the emitter and nearly up to the collector, whereby substantially the entire emitter-base current path is within reach of and thus subject to a depletion layer extending from the collector junction, means for biasing the emitter junction in the forward direction, and a load circuit coupled to said collector region and including an impedance and means for applying a potential for biasing said collector junction in the reverse direction, said base region having a resistivity and said potential having a value at which a depletion layer is established in the base region in the emitter-base current path increasing its resistance and preventing appreciable current from flowing therein, whereby the device exhibits a negative-resistance characteristic.

20. A transistor circuit arrangement comprising a semi-conductive body having closely-spaced, opposed emitter and collector area rectifying junctions defining, in the order named, an emitter region, a base region and a collector region and a current path between the emitter and collector junctions, a base connection to said base region at an area outside the emitter-collector current path, a substantially non-conductive region in said base region interposed between the emitter region and the base connection such that any possible current path between the emitter junction and the base connection includes the portion of the emitter-collector current path adjacent the emitter and nearly up to the collector, whereby the entire emitter-base current path is within reach of and thus subject to a depletion layer extending from the collector junction, means for biasing the emitter junction in the forward direction, a load circuit coupled to said collector region and including means for applying thereto a potential for biasing said collector junction in the reverse direction, said base region having a resistivity and said collector potential having a value at which a depletion layer is established in the base region up to the vicinity of the emitter-base current path, thereby effectively interrupting the emitter-base current path and reducing the current in the load circuit to a minimum value, and means for injecting minority carriers into the base region to increase the current in the load circuit to a higher value to turn the transistor on.

21. A circuit arrangement as set forth in claim 20, wherein the injecting means comprises optical means illuminating a portion of said semi-conductive body.

22. A circuit arrangement as set forth in claim 20, wherein the injecting means comprises means for applying a pulsatory voltage between the emitter and base connection.

23. A radiation-responsive circuit arrangement comprising a semi-conductive body having closely-spaced, opposed emitter and collector area rectifying junctions defining, in the order named, an emitter region, a base region and a collector region and a current path between the emitter and collector junctions, a base connection to said base region at an area outside the emitter-collector current path, a substantially non-conductive region in said base region interposed between the emitter region and the base connection such at substantially the entire current path between the emitter junction and the base connection includes the portion of the emitter-collector current path adjacent the emitter and nearly up to the collector, whereby the emitter-base current path is within reach of and thus subject to a depletion layer extending from the collector junction, means for biasing the emitter junction in the forward direction, and a load circuit coupled to said collector region and including means for applying thereto a potential for biasing said collector junction in the reverse direction, said base region having a resistivity and said collector potential having a value at which a depletion layer is established in the base region up to the vicinity of the emitter-base current path, thereby effectively interrupting the emitter-base current path and reducing the current in the load circuit to a minimum, a surface of said semi-conductive body being exposed to receive radiation thereby to inject minority carriers into the base region to increase the load circuit current to a higher value.

24. A radiation-responsive circuit arrangement as set forth in claim 23, wherein the collector circuit of the transistor includes a resistor.

25. A radiation-responsive circuit arrangement as set forth in claim 23, wherein the surface of the body containing the emitter region is adapted to receive the radiation.

26. A radiation-responsive circuit arrangement as set forth in claim 23, wherein the energizing winding of a relay is connected in series in the circuit of one of the electrodes of the transistor.

27. An oscillating circuit arrangement or the like comprising a semi-conductive body having closely-spaced, opposed emitter and collector area rectifying junctions defining, in the order named, an emitter region, a base region and a collector region and a current path between the emitter and collector junctions, a base connection to said base region at an area outside the emitter-collector current path, a substantially non-conductive region in said base region interposed between the emitter region and the base connection such that substantially the entire current path between the emitter junction and the base connection includes the portion of the emitter-collector current path adjacent the emitter and nearly up to the collector, whereby the emitter-base current path is within reach of and thus subject to a depletion layer extending from the collector junction, means for biasing the emitter junction in the forward direction, a load circuit coupled to said collector region and including means for applying thereto a potential for biasing said collector junction in the reverse direction, said base region having a resistivity and said potential having a value at which a depletion layer is established in the base region up to the vicinity of the emitter-base current path, and means for periodically establishing a reverse potential across the collector junction to interrupt the emitter-base current path.

28. An arrangement as set forth in claim 27, wherein a feed-back quadripole is included in the circuit to control the amplitude of the oscillations produced.

29. An arrangement as set forth in claim 27, wherein a feed-back quadripole including a series-resonant circuit is coupled between the collector and base connection.

30. A memory circuit comprising a plurality of semi-conductive bodies, each of said bodies having closely-spaced, opposed emitter and collector area rectifying junctions defining, in the order named, an emitter region, a base region and a collector region and a current path between the emitter and collector junctions, a base connection to said base region at an area outside the emitter-collector current path, a substantially non-conductive region in said base region interposed between the emitter region and the base connection such that the current path between the emitter junction and the base connection includes the portion of the emitter-collector current path adjacent the emitter and nearly up to the collector, whereby the emitter-base current path is within reach of and thus subject to a depletion layer extending from the collector junction; said bodies being connected in cascade with base input and common emitter; means for applying to said collector region a pulsatory potential for biasing said collector junction in the reverse direction at which a depletion layer is established in the base region up to the vicinity of the emitter-base current path effectively interrupting the emitter-base current path, and input means to the first of said cascaded bodies to establish free minority charge carriers in the associated base region.

31. An arrangement as set forth in claim 30, wherein the pulsatory potential applied to said collector is periodic, and in the time interval between pulses, means are provided to supply a second pulse of smaller amplitude to eliminate the free charge carriers.

32. An arrangement as set forth in claim 31, wherein the pulsatory potential and the second pulse emanate from a single source in the form of one of a stepped or sawtooth wave.

33. A bistable trigger circuit arrangement comprising a semi-conductive body having emitter and collector junctions defining emitter, collector and base regions, and a connection to said base region, said regions being arranged so that the entire current path in the base region between the emitter junction and the base connection lies adjacent the collector junction and spaced therefrom a distance smaller than the junction spacing, means to connect said emitter region to a point of fixed potential, means to connect said collector region through a load resistor to another point of fixed potential to provide a bias on the collector to base junction in the reverse direction, a source of trigger pulses connected to the base connection, said collector bias having a value at which, in the absence of the trigger pulses, the current path between the emitter and the base connection is effectively cut-off by the collector depletion region, said trigger pulses having a value at which sufficient current is caused to flow in the collector circuit reducing the collector bias causing the collector depletion region to withdraw opening up the emitter-base current path for substantially high current flow.

(References on following page)

References Cited in the file of this patent

UNITED STATES PATENTS

| | | | |
|---|---|---|---|
| 2,591,961 | Moore | Apr. 8, | 1952 |
| 2,644,896 | Lo | July 7, | 1953 |
| 2,689,930 | Hall | Sept. 21, | 1954 |
| 2,697,269 | Fuller | Dec. 21, | 1954 |
| 2,744,970 | Shockley | May 8, | 1956 |
| 2,754,431 | Johnson | July 10, | 1956 |
| 2,757,439 | Burns | Aug. 7, | 1956 |
| 2,764,642 | Shockley | Sept. 25, | 1956 |
| 2,765,986 | Pompetti et al. | Oct. 9, | 1956 |
| 2,779,877 | Lehovec | Jan. 29, | 1957 |
| 2,790,034 | McAfee | Apr. 23, | 1957 |
| 2,792,539 | Lehovec | May 14, | 1957 |
| 2,802,159 | Stump | Aug. 6, | 1957 |
| 2,805,347 | Haynes | Sept. 3, | 1957 |
| 2,820,153 | Woll | Jan. 14, | 1958 |
| 2,842,668 | Rutz | July 8, | 1958 |
| 2,844,770 | Vessem | July 22, | 1958 |
| 2,862,115 | Ross | Nov. 25, | 1958 |
| 2,885,609 | Williams | May 5, | 1959 |
| 2,907,934 | Engel | Oct. 6, | 1959 |
| 2,927,222 | Turner | Mar. 1, | 1960 |
| 2,941,131 | Wiliams | June 14, | 1960 |

FOREIGN PATENTS

| | | | |
|---|---|---|---|
| 81,362 | Denmark | July 2, | 1956 |

OTHER REFERENCES

"Voltage Punch-Through and Avalanche Breakdown and Their Effect on the Maximum Operating Voltages for Junction Transistors," by Hans Schenkel and Hermann Statz, National Electronics Conference Paper, published February 8, 1955, vol. X, pages 614–625.

UNITED STATES PATENT OFFICE
CERTIFICATE OF CORRECTION

Patent No. 3,081,418                  March 12, 1963

Jan Adrianus Manintveld et al.

It is hereby certified that error appears in the above numbered patent requiring correction and that the said Letters Patent should read as corrected below.

Column 3, line 27, for "non-conductve" read -- non-conductive --; column 4, line 12, for "potetnial" read -- potential --; line 47, for "later" read -- lateral --; column 5, line 44, for "FIG." read -- FIGS. --; column 11, line 20, for "Accordingly" read -- According --; column 16, line 29, for "shifts to" read -- shifts on to --; column 17, line 2, for "conductivty" read -- conductivity --; column 19, line 32, for "at" read -- that --.

Signed and sealed this 8th day of October 1963.

(SEAL)
Attest:

ERNEST W. SWIDER
Attesting Officer

EDWIN L. REYNOLDS
Acting Commissioner of Patents